(12) United States Patent
Ohashi et al.

(10) Patent No.: US 7,345,669 B2
(45) Date of Patent: Mar. 18, 2008

(54) PHOTOMETRIC DEVICE OF LIQUID CRYSTAL DISPLAY AND LIQUID CRYSTAL DISPLAY

(75) Inventors: Mitsuo Ohashi, Tokyo (JP); Ikufumi Honda, Tokyo (JP)

(73) Assignee: Eizo Nanao Corporation, Ishikawa (JP)

( * ) Notice: Subject to any disclaimer, the term of this patent is extended or adjusted under 35 U.S.C. 154(b) by 108 days.

(21) Appl. No.: 10/551,342

(22) PCT Filed: Mar. 28, 2003

(86) PCT No.: PCT/JP03/04003

§ 371 (c)(1),
(2), (4) Date: Jun. 5, 2006

(87) PCT Pub. No.: WO2004/088401

PCT Pub. Date: Oct. 14, 2004

(65) Prior Publication Data

US 2006/0274022 A1 Dec. 7, 2006

(51) Int. Cl.
*G09G 3/36* (2006.01)
*G08B 23/00* (2006.01)
*G01J 1/42* (2006.01)
*G02F 1/133* (2006.01)

(52) U.S. Cl. ............... 345/102; 345/690; 340/501; 356/221; 356/223; 349/16; 349/17; 349/61; 349/193; 349/199

(58) Field of Classification Search ............ 349/1, 349/16, 17, 28, 50, 56, 61, 81, 104, 193, 349/199; 356/221, 222, 223, 224, 230; 345/601, 345/602, 207, 690, 102; 340/501, 513, 815.86
See application file for complete search history.

(56) References Cited

U.S. PATENT DOCUMENTS

| | | | | |
|---|---|---|---|---|
| 4,760,389 A | * | 7/1988 | Aoki et al. ............ | 345/102 |
| 6,081,254 A | * | 6/2000 | Tanaka et al. ......... | 382/167 |
| 6,107,998 A | * | 8/2000 | Kulik et al. ........... | 345/211 |
| 6,198,531 B1 | * | 3/2001 | Myrick et al. ......... | 356/300 |
| 6,762,741 B2 | * | 7/2004 | Weindorf ............... | 345/102 |
| 2002/0109664 A1 | | 8/2002 | Shimada ............... | 345/102 |

FOREIGN PATENT DOCUMENTS

| JP | 2000-305537 | 11/2000 | ......... 345/102 X |
|---|---|---|---|
| JP | 2002-251149 | 9/2002 | ......... 345/102 X |

* cited by examiner

*Primary Examiner*—Brian M. Healy
(74) *Attorney, Agent, or Firm*—Young & Thompson

(57) ABSTRACT

A photometric device of liquid crystal display and a liquid crystal display in which photometry can be performed without relying upon manpower and the liquid crystal plane is shielded only at the time of photometry. The photometric device comprises a liquid crystal display part, a bezel surrounding the four sides of the liquid crystal display, a shaft part provided at the corner part of the bezel and fixed rotatably thereto, a movable part having the end part thereof connected to the shaft part, and a sensor part provided in the liquid crystal display part at the other end part of the movable part.

10 Claims, 8 Drawing Sheets

PHOTOMETRIC DEVICE OF LIQUID CRYSTAL DISPLAY AND LIQUID CRYSTAL DISPLAY

TECHNICAL FIELD

The present invention relates to a photometric device of a liquid crystal display device provided with a light control function, and a light quantity photometric technology and calibration method for realizing the liquid crystal display device.

BACKGROUND ART

In recent years, a number of liquid crystal display devices have been used in home televisions, computers, videophones, and the like. Many of these liquid crystal display devices have a backlight. Particularly, liquid crystal display devices used in the printing industry and for medical application require reproducibility, so that the light quantity of the backlight is controlled by providing photodetectors on back surfaces of the liquid crystal display devices and performing photometry on the light quantity of the backlight. Furthermore, in liquid crystal panels, light transmission characteristics undergo nonlinearly significant changes due to operating temperature and time deterioration. Hence, photometry from a front surface of the liquid crystal, as well as the light control of the backlight and the liquid crystal are performed these days, and its image sensors and photodetectors are often calibrated manually by putting moving sensors separated from the liquid crystal display devices closer to display screens, or often calibrated with sensors fixed by covering a part of the front surface of the liquid crystal.

However, if photometry of the light quantity on the front surface of the liquid crystal is performed with the moving sensors separated from the liquid crystal display devices in a conventional way, such photometry operation is demanding in a printing site or a medical site in which a lot of liquid crystal display devices are used in one place as has been the case in recent times, and inconvenient. On the other hand, if photometry is performed with the fixed sensors, display of a part of a screen is always sacrificed, with a problem that the whole screen cannot be effectively displayed. In addition, either method involves attempts to perform photometry on the light quantity of light from the backlight appearing on a front surface of the liquid crystal display device, but photometry in a bright room is affected by ambient light, and thus it does not always result in photometry of a correct light quantity. A photometry method and a calibration method with either problem solved are being desired.

Accordingly, an object of the present invention is to provide a photometric device of a liquid crystal display device which is capable of performing photometry without manpower, and which does not shield a liquid crystal surface other than during photometry, and the liquid crystal display device.

DISCLOSURE OF THE INVENTION

The photometric device of the present invention has a moving structure which covers a part of a front surface of a liquid crystal display device only during photometry, and does not cover the front surface of the liquid crystal display device other than during the photometry. It is a first means of the present invention to apply this structure to a photometric device with a structure incorporated into the main body of a liquid crystal display device. This allows automatic computing photometry, not manually. A second means allows photometry insensitive to ambient light by adding reference light from a backside surface of a liquid crystal display device during the photometry, and capturing this reference light at a front surface of the liquid crystal display device to perform photometry. A third means allows knowledge about a state of current ambient light together by performing photometry on the illuminance of surrounding light of a liquid crystal display device simultaneously with photometry on a front surface of the liquid crystal display device. A fourth means allows knowledge about light transmission characteristics of a liquid crystal panel together by performing photometry on the light quantity of backlight at a back surface of a liquid crystal display device simultaneously with photometry at a front surface of the liquid crystal display device

BEST MODE FOR CARRYING OUT THE INVENTION

Hereinafter, the embodiment of the present invention will be described in detail with reference to the drawings.

Embodiment 1

Figure 1:
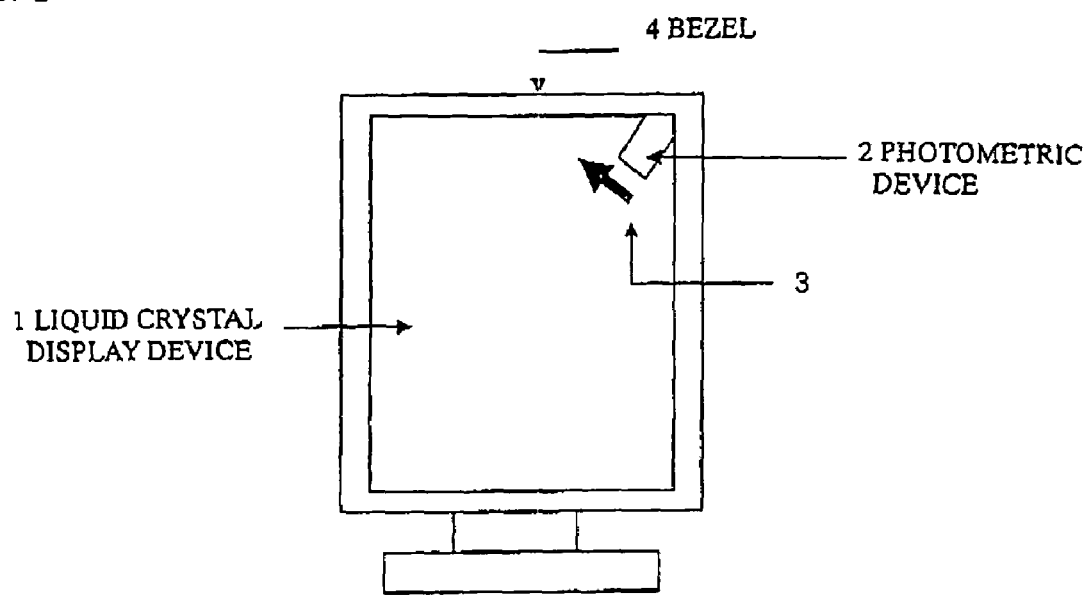
FIG. 1 is a block diagram showing a first embodiment of a photometric device of a liquid crystal display device and the liquid crystal display device according to the present invention.

FIG. 1 is an entire block diagram of a photometric device of a first embodiment according to the present invention. A photometric device 2 is movably disposed in at least one of four corners of a liquid crystal display device 1 comprising a square liquid crystal surface and a bezel 4 surrounding its circumference. The photometric device is moved to a front surface of the liquid crystal display device during photometry, and after the photometry, draws a circle with a focus on a corner portion of the liquid crystal surface, is moved with rotation in a direction of the arrow indicated by 3, and stored into the bezel 4.

Figure 2:
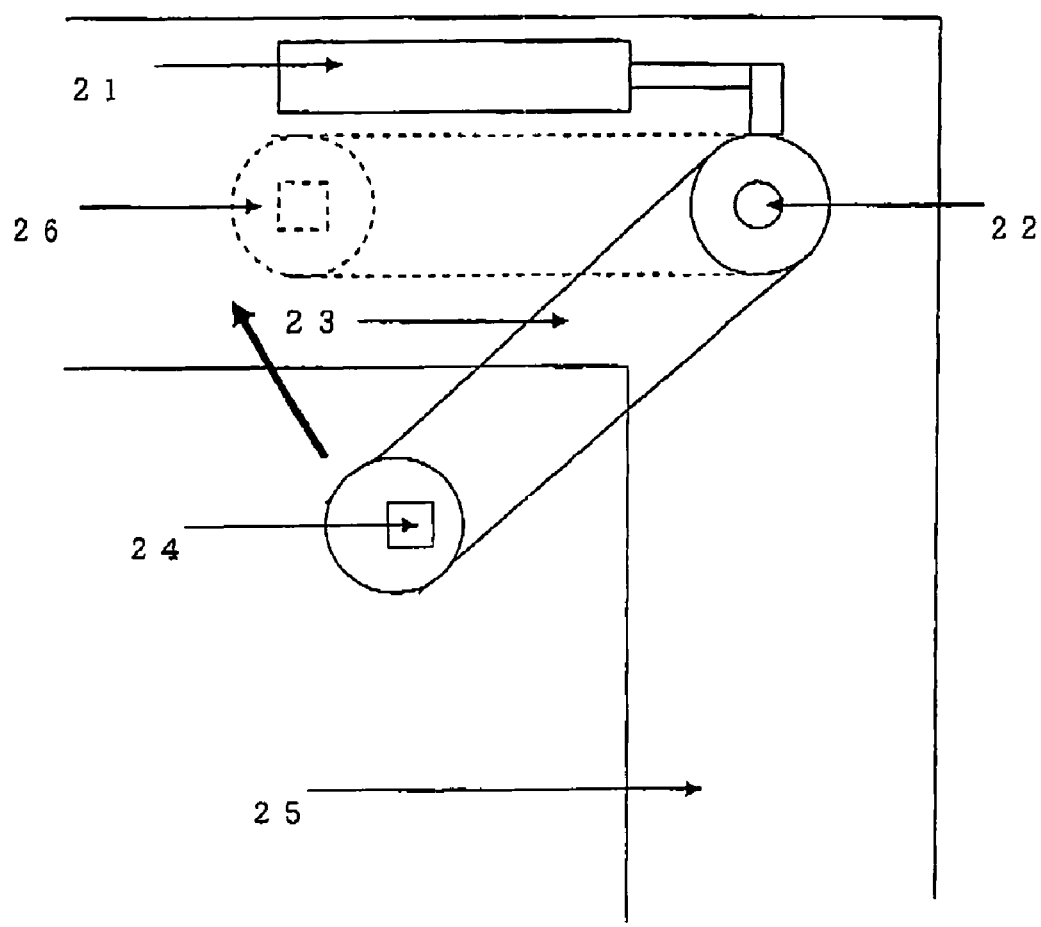
FIG. 2 is a partial enlarged view showing a first embodiment of a photometric device of a liquid crystal display device and the liquid crystal display device according to the present invention.

FIG. 2 is a detail view of the photometric device of the first embodiment according to the present invention. A photometric device moving portion 23 with a sensor 24 facing the front surface of the liquid crystal display device is rotatably disposed by a drive circuit of a micro motor 21 with a focus on a shaft 22 positioned in a bezel 25, moved to the position shown in dashed line 26 in FIG. 2 during the photometry, and placed in the position shown in solid line 27 other than during the photometry. This moving method allows the photometric device moving portion to be hidden in the bezel 25 other than during the photometry, without disturbing a liquid crystal display portion. The sensor covers the front surface of the liquid crystal display device during the photometry, thus making it possible to perform photometry.

Embodiment 2

Figure 3:
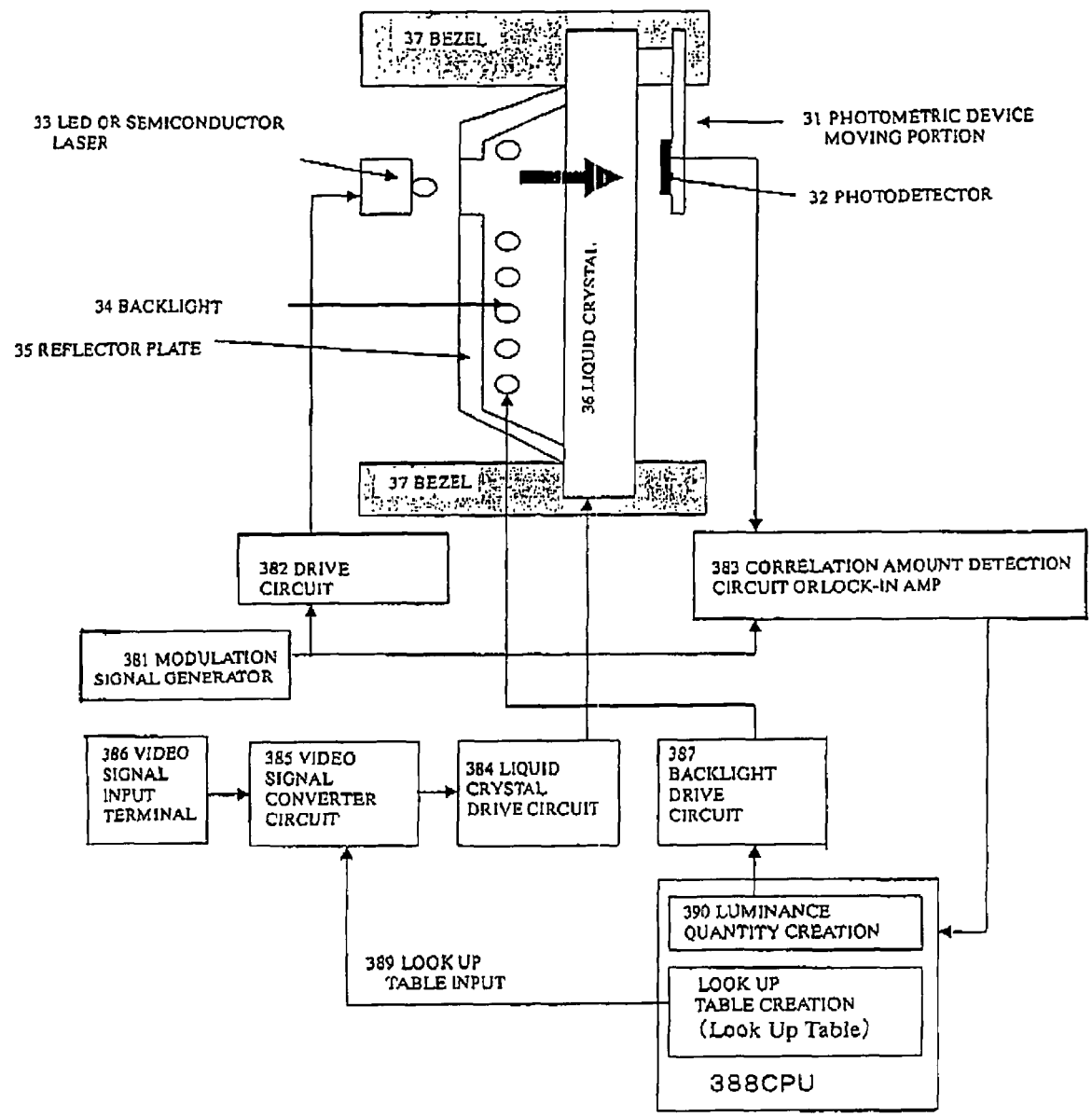
FIG. 3 is a block diagram showing a second embodiment of a photometric device of a liquid crystal display device and the liquid crystal display device according to the present invention.

FIG. 3 shows a method of performing calibration of a video signal using a photometric device of a second embodiment according to the present invention. A photodetector 32 on a photometric device moving portion 31 attached to a bezel 37 is moved to a surface of a liquid crystal display device 36, and a light emitting diode or a semiconductor laser 33 is located facing from a window opened in a part of a reflector plate 35 on the backside of a liquid crystal panel toward the display side. Here, the photodetector 32 uses a silicon PN diode, while the light emitting diode 33 uses four types of light: RGBW (Red, Green, Blue, and White) side by side. An 11-bits staircase signal for calibration (refer to FIG. 8(A)) is supplied from a video signal input terminal 386. The duration of the stairs was set to 1 millisecond. At first, this signal is directly supplied to a liquid crystal drive circuit 384 to cause changes in a transmission state of the liquid crystal display device without referring to a Look Up Table 389 described later. At this point in time, a backlight drive circuit 387 also uses an arbitrary default value as a default value without referring to a 390 luminance quantity.

A modulation signal generator 381 generates sinusoidal signals with different frequencies (for example, four different types of 100 KHz, 200 KHz, 300 KHz and 400 KHz), or four orthogonal patterns in a pseudo-random sequence. (For example, it provides a 16-bits sequence obtained from Hadamard matrix as shown in Table 1. Reference literature: "CDMA with MATLAB/Simulink," Author: Yukitoshi Sanada, Tokyo Denki University Press)

TABLE 1

| 1 | 1 | -1 | -1 | -1 | -1 | 1 | 1 | 1 | 1 | -1 | -1 | -1 | -1 | 1 | 1 |
| 1 | -1 | -1 | 1 | -1 | 1 | 1 | -1 | 1 | -1 | -1 | 1 | -1 | 1 | 1 | -1 |
| 1 | 1 | 1 | 1 | 1 | 1 | 1 | 1 | -1 | -1 | -1 | -1 | -1 | -1 | -1 | -1 |
| 1 | -1 | 1 | -1 | 1 | -1 | 1 | -1 | -1 | 1 | -1 | 1 | -1 | 1 | -1 | 1 |

Figure 8:
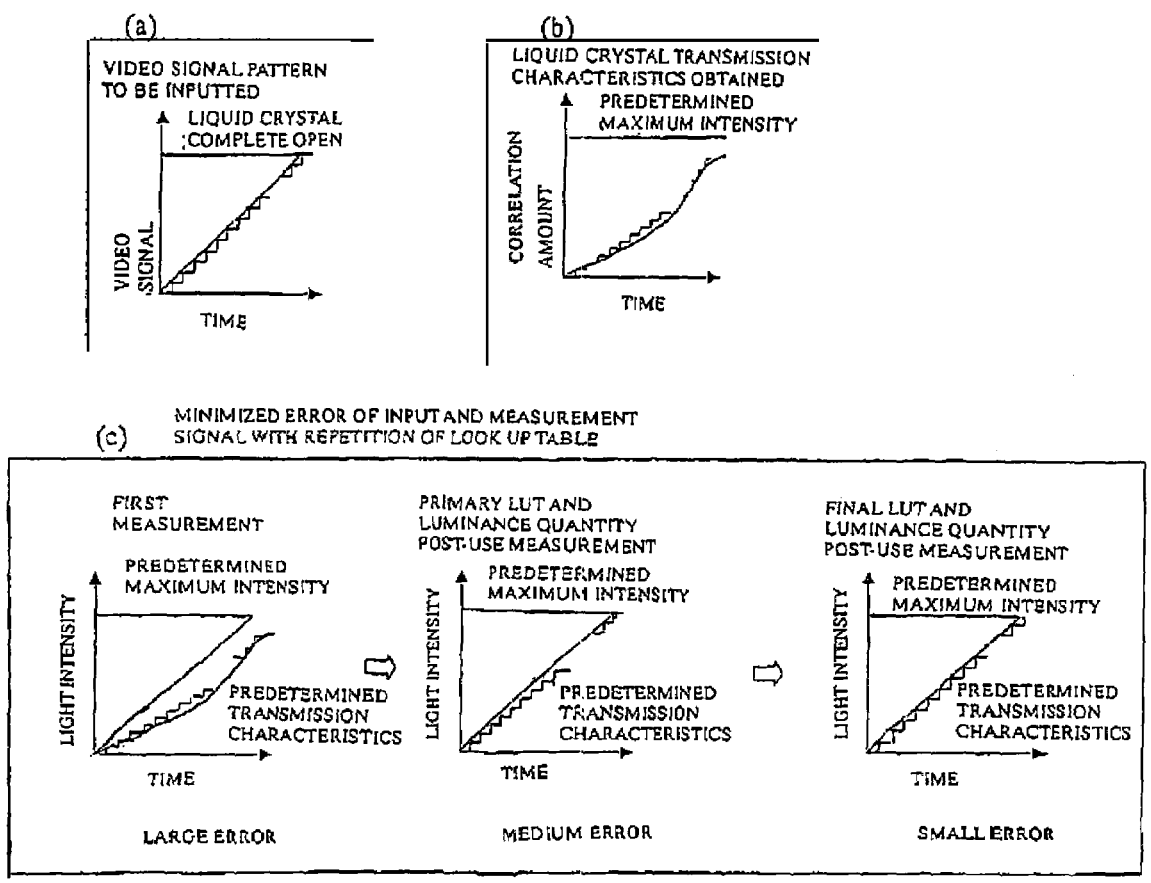
FIG. 8 is a photometric device of a liquid crystal display device and the liquid crystal display according to the present invention, (a) being a graph of a video signal, (b) being a graph of a correlation amount, and (c) being a graph of light intensity changes.

Upon multiply and accumulation, these sequences are brought to zero between different sequences. It will be obvious that the sinusoidal waves with different frequencies are also brought to zero, when integrated between sections; of the order of the least common multiple of a cycle. Namely, all of these sequences have orthogonal properties. Pulse modulated signals such that 1 is set to ON, and -1 is set to OFF are created to allocate to four light emitting diodes. Here, the duration of the minimum pulse was set to 1 microsecond. These modulated signals are supplied to each of the light emitting diodes 33 through a drive circuit 382 to generate a light modulation signal. This light modulation signal from the backside of the liquid crystal panel toward the display side is detected by the photodetector 32. A signal detected from the photodetector is supplied to a correlation detection circuit 383. If a modulating signal is a sinusoidal wave, the correlation detection circuit 383 may exclude ambient noise to detect the amplitude of the light modulation signal by being regarded as a lock-in amp and synchronized with the same frequency. A description will be given of the operation of the correlation detection circuit in a case where a modulating signal is a pseudo random sequence. A correlation between an analog-to-digital conversion value and the pseudo random sequence is obtained with a sampling frequency of 10 MHz. Such a correlation can be obtained, for example, by multiplying 1 of the pseudo random sequence as +1, and 0 as -1 (in the case of Hadamard matrix, the value may be as described above) by a value sampled by analog-to-digital conversion to get a product, and finding an accumulation over a time period of integral multiple of the cycle of the pseudo random sequence. The frequencies and the pseudo random sequences allocated to the four colors of RGBW are mutually orthogonal, so that a transmission coefficient may be independently calculated for each of the light emitting diodes even in the case of simultaneous measurement. If this procedure is repeated in a staircase of the next video signal until the stair which is expected to be the last gradation, it is possible to obtain light transmission characteristics of the liquid crystal to the staircase calibration signal as shown in FIG. 8(B) with respect to one color. The deformed transmission curve noted in FIG. 8(B) is attributable to the fact that the liquid crystal has different transmission characteristics depending upon temperature and the degree of deterioration. This is supplied to a CPU 388, normalized with a predetermined maximum intensity required for the display device, and compared with the staircase video signal for calibration to create its Look Up Table (LUT) and a proper luminance quantity. The resultant Look Up Table is supplied to a video signal converter circuit 385, and the luminance quantity is supplied to a backlight drive circuit 387 to generate a converter circuit based on a primary LUT. After this, the 11-bit staircase signal for calibration is supplied to the video signal input terminal again, in accordance with the flow as shown in FIG. 8(C), and a secondary LUT is created in accordance with a similar procedure to generate a secondary converter circuit. This repetition allows for gradual approach to predetermined transmission characteristics. The calibration is completed with the generation of the LUT converter circuit at a point when the error has been minimized, and the luminance quantity supplied to the backlight drive circuit. In the photodetector, the light quantity of backlight is detected together, and detection accuracy may be increased by turning the backlight off as background noise becomes larger. However, this method allows a background element to be removed during correlation detection in demodulating the light modulation signal, and thus the LUT generation is possible even in an on-state of the backlight. The method has been described in a procedure about calibration on each color of color display, but it goes without saying that the calibration may be performed on monochrome display.

Embodiment 3

Figure 4:
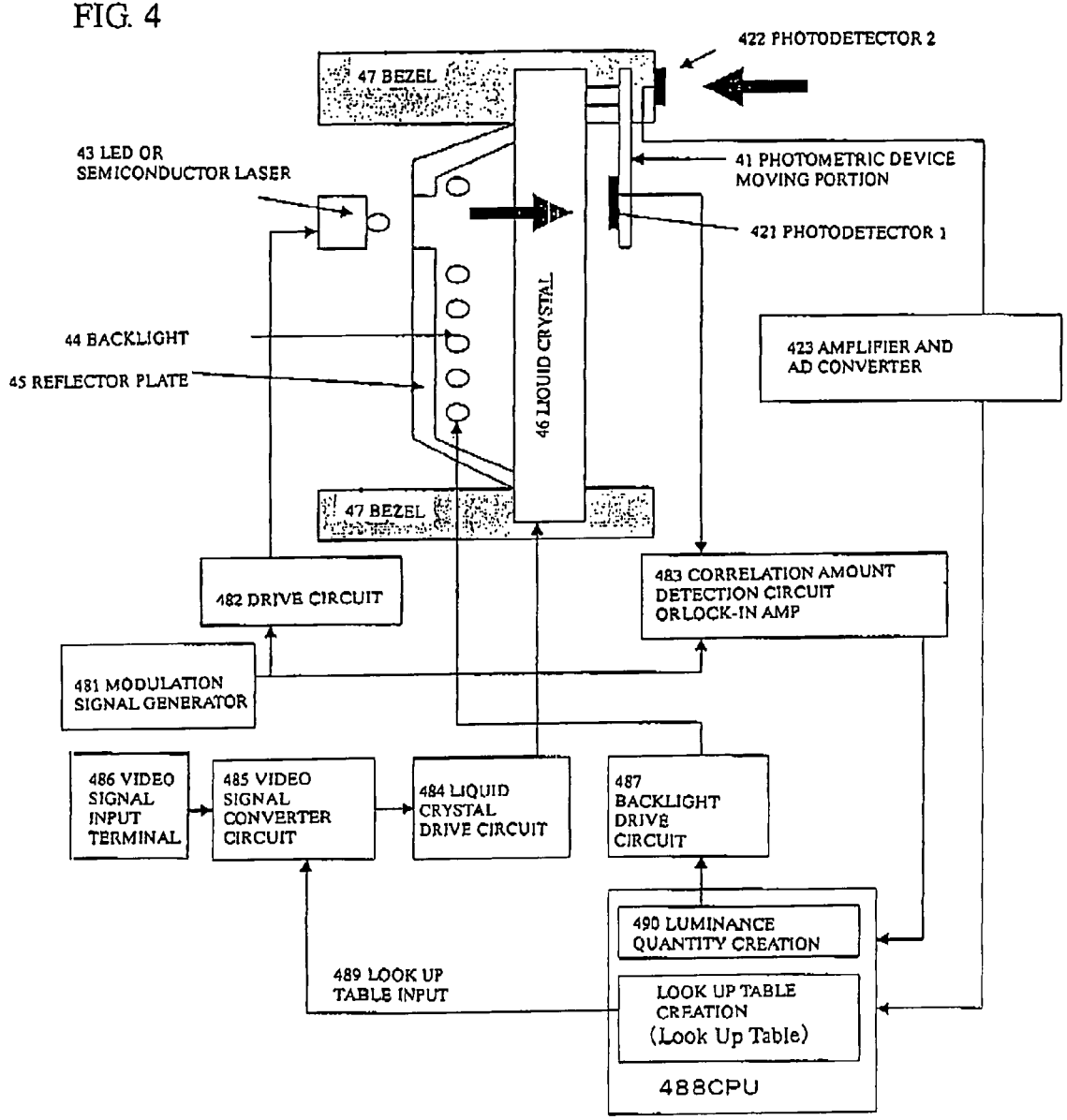
FIG. 4 is a block diagram showing a third embodiment of a photometric device of a liquid crystal display device and the liquid crystal display device according to the present invention.

FIG. 4 shows a method of performing calibration of a video signal using a photometric device of a third embodiment according to the present invention. A photodetector 422 is located on a front surface of a bezel 47, and its output signal is translated into a digital value through a 423 amplifier and AD converter to transmit to a CPU 488. A photodetector 421 on a photometric device moving portion 41 attached to the bezel 47 is moved to a surface of a liquid crystal display device 46, and a light emitting diode or a semiconductor laser 43 is located facing from a window opened in a part of a reflector plate 45 on the backside of a liquid crystal panel toward the display side. Here, the photodetectors 421 and 422 use silicon PN diodes, while a light emitting diode 43 uses four types of light: RGBW (Red, Green, Blue, and White) side by side. An 11-bit staircase signal for calibration (refer to FIG. 8(A)) is supplied from a video signal input terminal 486. The duration of the stairs was set to 1 millisecond. At first, this signal is directly supplied to a liquid crystal drive circuit 484 to cause changes in a transmission state of the liquid crystal display device without referring to a Look Up Table 489 described later. At this point in time, a backlight drive circuit 487 also uses an arbitrary default value without referring to a luminance quantity 490.

A modulation signal generator 481 is sinusoidal signals with different frequencies (for example, four different types of 100 KHz, 200 KHz, 300 KHz, and 400 KHz), or four orthogonal patterns in a pseudo-random sequence. (For example, it provides a 16-bit sequence obtained from Hadamard matrix as shown in Table 2. Reference literature: "CDMA with MATLAB/Simulink," Author: Yukitoshi Sanada, Tokyo Denki University Press)

TABLE 2

| 1 | 1 | −1 | −1 | −1 | −1 | 1 | 1 | 1 | 1 | −1 | −1 | −1 | −1 | 1 | 1 |
|---|---|---|---|---|---|---|---|---|---|---|---|---|---|---|---|
| 1 | −1 | −1 | 1 | −1 | 1 | 1 | −1 | 1 | −1 | −1 | 1 | −1 | 1 | 1 | −1 |
| 1 | 1 | 1 | 1 | 1 | 1 | 1 | 1 | −1 | −1 | −1 | −1 | −1 | −1 | −1 | −1 |
| 1 | −1 | 1 | −1 | 1 | −1 | 1 | −1 | −1 | 1 | −1 | 1 | −1 | 1 | −1 | 1 |

Upon multiply and accumulation, these sequences are brought to zero between different sequences. It will be obvious that the sinusoidal waves with different frequencies are also brought to zero, when integrated between sections of the order of the least common multiple of a cycle. Namely, all of these sequences have orthogonal properties. Pulse modulated signals such that 1 is set to ON, and −1 is set to OFF are created to allocate to four light emitting diodes. Here, the duration of the minimum pulse was set to 1 microsecond. These modulated signals are supplied to each of the light emitting diodes 43 through a drive circuit 482 to generate a light modulation signal. This light modulation signal from the backside of the liquid crystal panel toward the display side is detected by the photodetector 421. A signal detected from the photodetector is supplied to a correlation detection circuit 483. If a modulating signal is a sinusoidal wave, the correlation detection circuit 483 may exclude ambient noise to detect the amplitude of the light modulation signal by being regarded as a lock-in amp and synchronized with the same frequency. A description will be given of the operation of the correlation detection circuit in a case where a modulating signal is a pseudo random sequence. A correlation between an analog-to-digital conversion value and the pseudo random sequence is obtained with a sampling frequency of 10 MHz. Such a correlation can be obtained, for example, by multiplying 1 of the pseudo random sequence as +1, and 0 as −1 (in the case of Hadamard matrix, the value may be as described above) by a value sampled by the analog-to-digital conversion to get a product, and finding an accumulation over a time period of integral multiple of the cycle of the pseudo random sequence. The frequencies and the pseudo random sequences allocated to the four colors of RGBW are mutually orthogonal, so that a transmission coefficient may be independently calculated for each of the light emitting diodes even in the case of simultaneous measurement. If this procedure is repeated in a staircase of the next video signal until the stair which is expected to be the last gradation, it is possible to obtain the light transmission characteristics of the liquid crystal to the staircase calibration signal as shown in FIG. 8(B) with respect to one color. The deformed transmission curve noted in FIG. 8(B) is attributable to the fact that the liquid crystal has different transmission characteristics depending upon temperature and the degree of deterioration. This signal and ambient illumination of the front surface of the liquid crystal obtained by the 422 photodetector are supplied to the CPU 488, normalized with a predetermined maximum intensity required for the display device, and compared with the staircase video signal for calibration to create its Look Up Table (LUT) and a proper luminance quantity. The resultant Look Up Table is supplied to a video signal converter circuit 485, and the luminance quantity is supplied to a backlight drive circuit 487 to generate a converter circuit based on a primary LUT. After this, the 11-bit staircase signal for calibration is supplied to the video signal input terminal again, in accordance with the flow as shown in FIG. 8(C), and a secondary LUT is created in a similar procedure to generate a secondary converter circuit. This repetition allows for gradual approach to predetermined transmission characteristics. The calibration is completed with the generation of the LUT converter circuit at a point when the error has been minimized, and the luminance quantity supplied to the backlight drive circuit. In the photodetector 421, the light quantity of backlight is detected together, and detection accuracy may be increased by turning the backlight off as background noise becomes larger. However, this method allows a background element to be removed during correlation detection in demodulating the light modulation signal, and thus the LUT generation is possible even in an on-state of the backlight. The method has been described in a procedure about calibration on each color of color display, but it goes without saying that the calibration may be performed on monochrome display.

Embodiment 4

Figure 5:
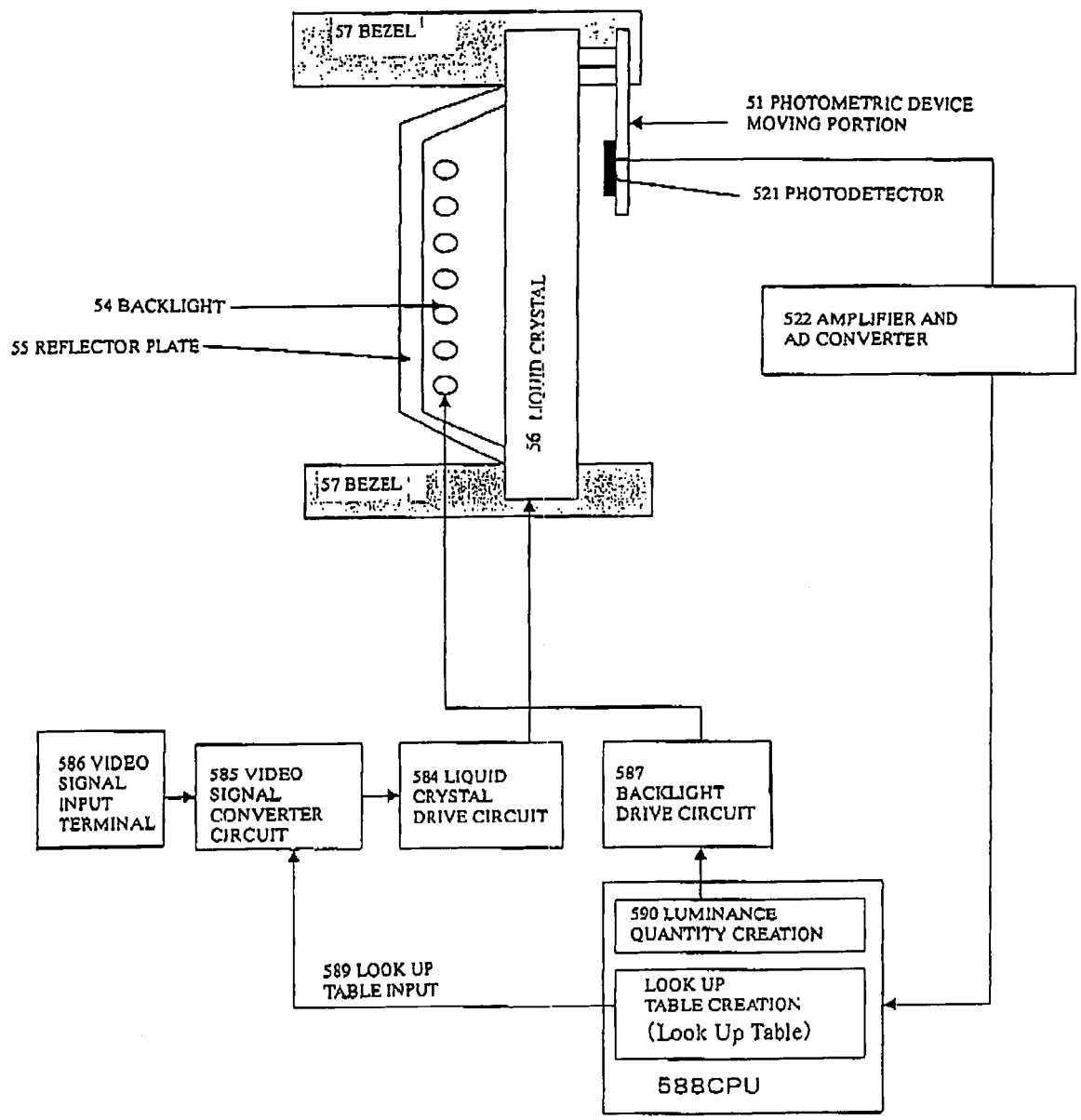
FIG. 5 is a block diagram showing a fourth embodiment of a photometric device of a liquid crystal display device and the liquid crystal display device according to the present invention.

FIG. 5 shows a method of performing calibration of a video signal using a photometric device of a fourth embodiment according to the present invention. A photodetector 521 on a photometric device moving portion 51 attached to a bezel 57 is moved to a surface of a liquid crystal display device 56. Here, the photodetector 521 uses a silicon PN diode. An 11-bit staircase signal for calibration (refer to FIG. 8(A)) is supplied from a video signal input terminal 586. The duration of the stairs was set to 1 millisecond. At first, this signal is directly supplied to a liquid crystal drive circuit 584 to cause changes in a transmission state of the liquid crystal display device without referring to a Look Up Table 589 described later. At this point in time, a backlight drive circuit 587 also uses an arbitrary default value as a default value without referring to a 590 luminance quantity. Light from backlight is detected by the photodetector 521 provided facing toward the display side of a liquid crystal panel. A luminance signal from the photodetector is converted into a digital signal through a 522 amplifier and AD converter and supplied to a 588 CPU. If this input signal is repeated from the minimum value to the stair which is expected to be the last gradation, there may be obtained light transmission characteristics of the liquid crystal with respect to the staircase calibration signal as shown in FIG. 8(B). The deformed transmission curve noted in FIG. 8(B) is attributable to the fact that the liquid crystal has different transmission characteristics depending upon temperature and the degree of deterioration. This signal is supplied to a CPU 588, normalized with a predetermined maximum intensity required for the display device, and compared with the staircase video signal for calibration to create its Look Up Table (LUT) and a proper luminance quantity. The resultant Look Up Table is supplied to a video signal converter circuit 585, and the luminance quantity is supplied to a backlight drive circuit 587 to generate a converter circuit based on a primary LUT. After this, the 11-bit staircase signal for calibration is supplied to the video signal input terminal again, in accordance with the flow as shown in FIG. 8(C), and a secondary LUT is created in a similar procedure to generate a secondary converter circuit. This repetition allows for gradual approach to predetermined transmission characteristics. The calibration is completed with the generation of the LUT converter circuit at a point when the error has been minimized, and with the luminance quantity supplied to the backlight drive circuit. It goes without saying that this method allows for calibration not only on color display, but also on monochrome display.

Embodiment 5

Figure 6:
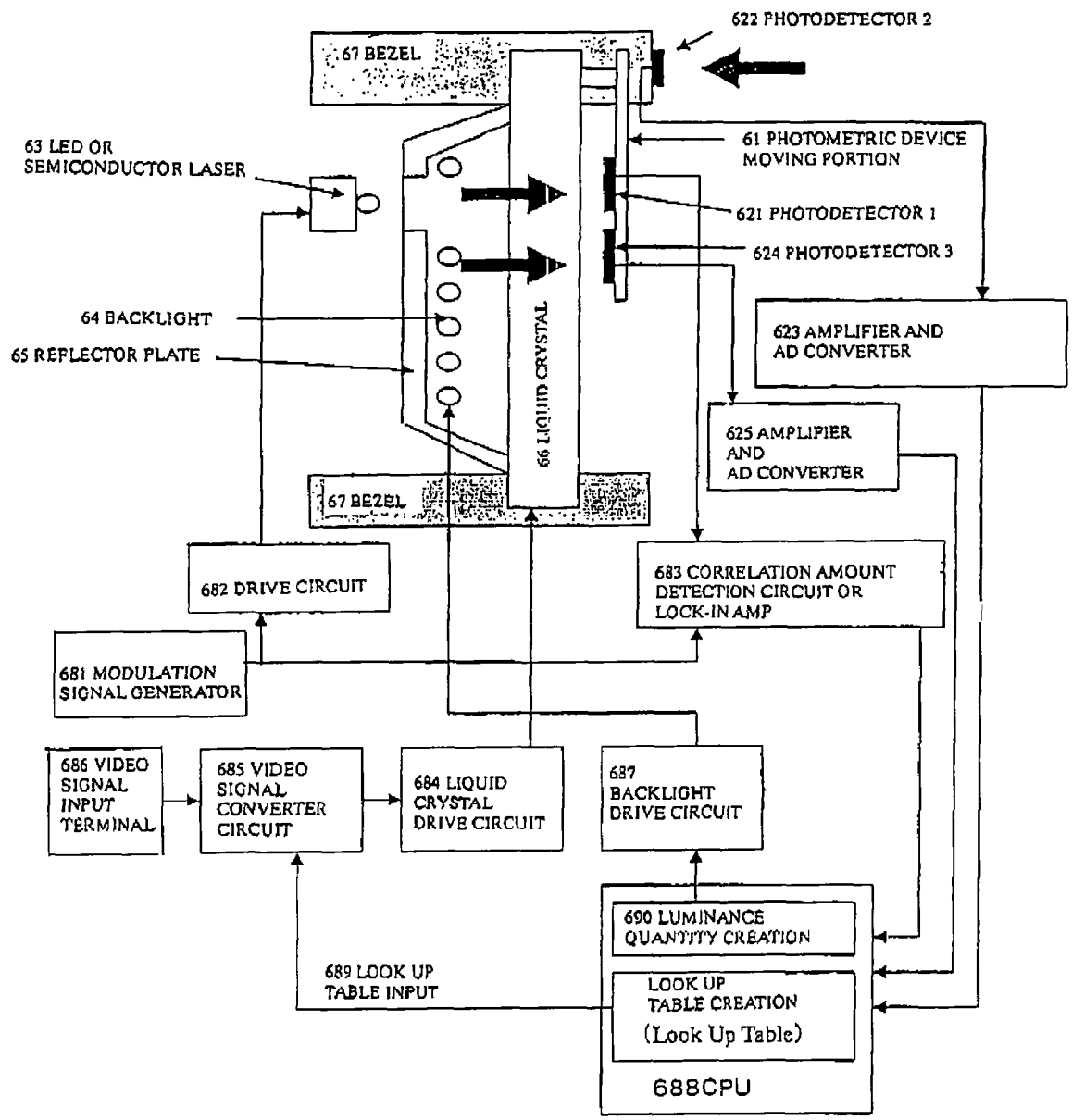
FIG. 6 is a block diagram showing a fifth embodiment of a photometric device of a liquid crystal display device and the liquid crystal display device according to the present invention.

FIG. 6 shows a method of performing calibration of a video signal using a photometric device of a fifth embodiment according to the present invention. A photodetector 622 is located on a front surface of a bezel 67, and its output signal is translated into a digital value through a 623 amplifier and AD converter to transmit to a CPU 688. Photodetectors 621 and 624 on a photometric device moving portion 61 attached to the bezel 67 are moved to a surface of a liquid crystal display device 66, and a light emitting diode or a semiconductor laser 63 is located facing from a window opened in a part of a reflector plate 65 on the backside of a liquid crystal panel toward the display side. Here, the photodetectors 621, 622, and 624 use silicon PN diodes, while the light emitting diode 63 uses four types of light: RGBW (Red, Green, Blue, and White) side by side, An 11-bit staircase signal for calibration (refer to FIG. 8(A)) is supplied from a video signal input terminal 686. The duration of the stairs was set to 1 millisecond. At first, this signal is directly supplied to a liquid crystal drive circuit 684 to cause changes in a transmission state of the liquid crystal display device without referring to a Look Up Table 689 described later. At this point in time, a backlight drive circuit 687 also uses an arbitrary default value as a default value without referring to a 690 luminance quantity.

A modulation signal generator 681 is sinusoidal signals with different frequencies (for example, four different types of 100 KHz, 200 KHz, 300 KHz, and 400 KHz), or four orthogonal patterns in a pseudo-random sequence. (For example, it provides a 16-bit sequence obtained from Hadamard matrix as shown in Table 3. Reference literature: "CDMA with MATLAB/Simulink," Author: Yukitoshi Sanada, Tokyo Denki University Press)

TABLE 3

| 1 | 1 | -1 | -1 | -1 | -1 | 1 | 1 | 1 | 1 | -1 | -1 | -1 | -1 | 1 | 1 |
| 1 | -1 | -1 | 1 | -1 | 1 | 1 | -1 | 1 | -1 | -1 | 1 | -1 | 1 | 1 | -1 |
| 1 | 1 | 1 | 1 | 1 | 1 | 1 | 1 | -1 | -1 | -1 | -1 | -1 | -1 | -1 | -1 |
| 1 | -1 | 1 | -1 | 1 | -1 | 1 | -1 | -1 | 1 | -1 | 1 | -1 | 1 | -1 | 1 |

Upon product-sum operation, these sequences are brought to zero between different sequences It will be obvious that the sinusoidal waves with different frequencies are also brought to zero, when integrated between sections of the order of the least common multiple of a cycle. Namely, all of these sequences have orthogonal properties. Pulse modulated signals such that 1 is set to ON, and -1 is set to OFF are created to allocate to four light emitting diodes. Here, the duration of the minimum pulse was set to 1 microsecond. These modulated signals are supplied to each of the light emitting diodes 63 through a drive circuit 682 to generate a light modulation signal. This light modulation signal from the backside of the liquid crystal panel toward the display side is detected by the photodetector 621. A signal detected from the photodetector is supplied to a correlation detection circuit 683. If a modulating signal is a sinusoidal wave, the correlation detection circuit 683 may exclude ambient noise to detect the amplitude of the light modulation signal by being regarded as a lock-in amp and synchronized with the same frequency. A description will be given of the operation of the correlation detection circuit in a case where a modulating signal is a pseudo random sequence. A correlation between an analog-to-digital conversion value and the pseudo random sequence is obtained with a sampling frequency of 10 MHz. Such a correlation can be obtained, for example, by multiplying 1 of a pseudo random sequence as +1, and 0 as -1 (in the case of Hadamard matrix, the value may be as described above) by a value sampled by the analog-to-digital conversion to get a product, and finding an accumulation over a time period of integral multiple of the cycle of the pseudo random sequence. The frequencies and the pseudo random sequences allocated to the four colors of RGBW are mutually orthogonal, so that a transmission coefficient may be independently calculated for each of the light emitting diodes even in the case of simultaneous measurement. If this procedure is repeated in a staircase of the next video signal until the stair which is expected to be the last gradation, it is possible to obtain light transmission characteristics of the liquid crystal to the staircase calibration signal as shown in FIG. 8(B) with respect to one color. The deformed transmission curve noted in FIG. 8(B) is attributable to the fact that the liquid crystal has different transmission characteristics depending upon temperature and the degree of deterioration. This signal and ambient illumination of a front surface of the liquid crystal obtained by the 622 photodetector are supplied to the CPU 688, normalized with a predetermined maximum intensity required for the display device, and compared with the staircase video signal for calibration to create its Look Up Table (LUT) and a proper luminance quantity. The resultant Look Up Table is supplied to a video signal converter circuit 685, and the luminance quantity is supplied to a backlight drive circuit 687 to generate a converter circuit based on a primary LUT. After this, the 11-bit staircase signal for calibration is supplied to the video signal input terminal again, in accordance with the flow as shown in FIG. 8(C), and a secondary LUT is created in a similar procedure to generate a secondary converter circuit. This repetition allows for gradual approach to predetermined transmission characteristics. The calibration is completed with the generation of the LUT converter circuit at a point when the error has been minimized, and with the luminance quantity supplied to the backlight drive circuit. In the photodetector 621, the light quantity of backlight is detected together, and detection accuracy may be increased by turning the backlight off as background noise becomes larger. However, this method willows a background element to be removed during correlation detection in demodulating the light modulation signal, and thus the LUT generation is possible even in an on-state of the backlight. The method has been described in a procedure about calibration on each color of color display, but it goes without saying that the calibration may be performed on monochrome display. Note that it makes no difference if the photodetectors 621 and 624 are used as one detector.

Embodiment 6

Figure 7:
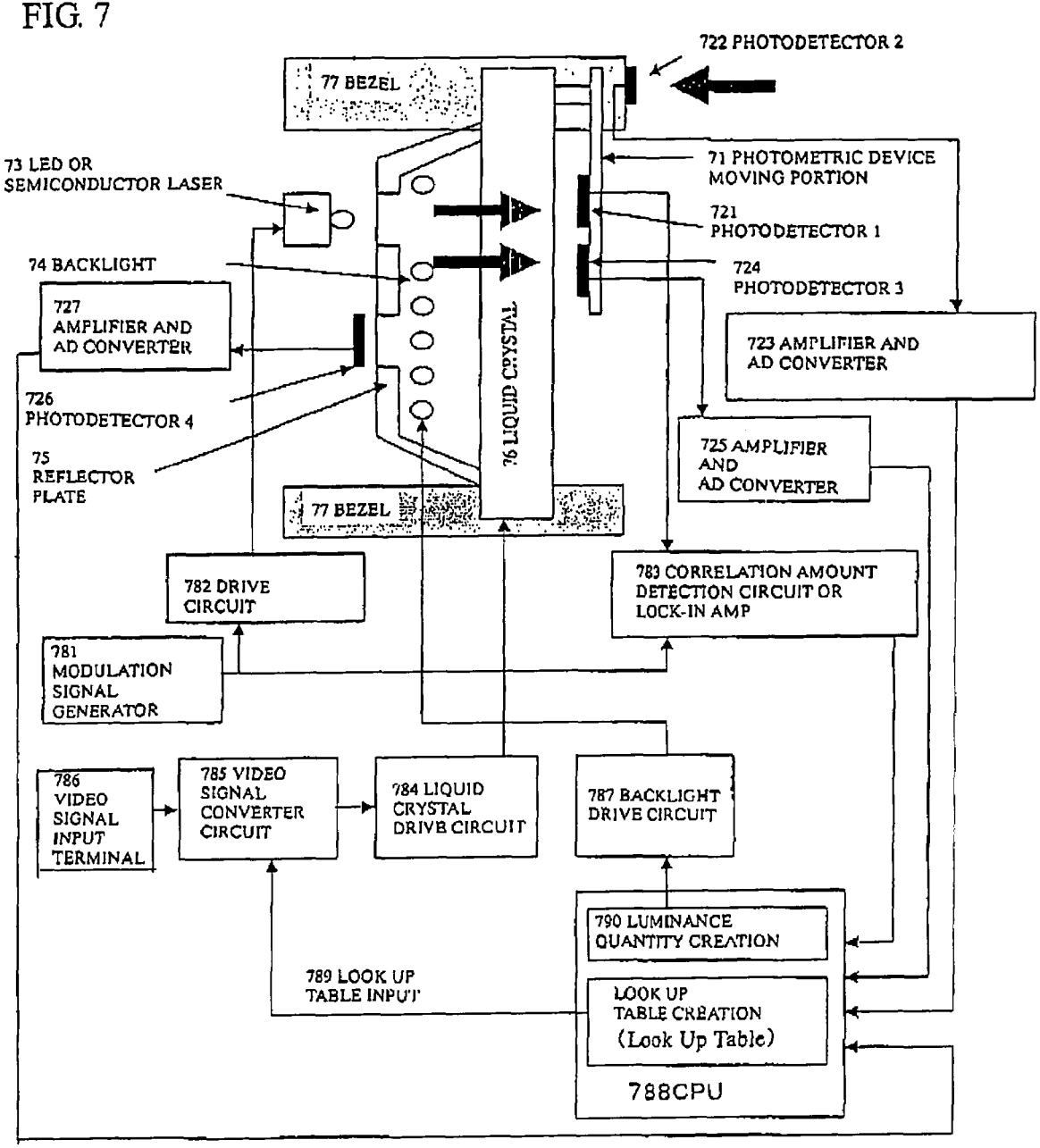
FIG. 7 is a block diagrams showing a sixth embodiment of a photometric device of a liquid crystal display device and the liquid crystal display device according to the present invention.

FIG. 7 shows a method of performing calibration of a video signal using a photometric device of a sixth embodiment according to the present invention. A photodetector 722 is located on a front surface of a bezel 77, and its output signal is translated into a digital value through a 723 amplifier and AD converter to transmit to a CPU 788. Photodetectors 721 and 724 on a photometric device moving portion 71 attached to the bezel 77 are moved to a surface of a liquid crystal display device 76, and a light emitting diode or a semiconductor laser 73 is located facing from a window opened in a part of a reflector plate 75 of the backside of a liquid crystal panel toward the display side. Furthermore, a 726 photodetector is located facing from a window opened in a part of the reflector plate 75 toward a display screen, and its luminance signal is digitized by a 727 amplifier and AD converter to transmit to the 788 CPU. Here, the photodetectors 721, 722, 724, and 726 use silicon PN diodes, while the light emitting diode 73 uses four types of light: RGBW (Red, Green, Blue, and White) side by side. An 11-bit staircase signal for calibration (refer to FIG. 8(A)) is supplied from a video signal input terminal 786. The duration of the stairs was set to 1 millisecond. At first, this signal is directly supplied to a liquid crystal drive circuit 784 to cause changes in a transmission state of the liquid crystal display device without referring to a Look Up Table 789 described later. At this point in time, a backlight drive circuit 787 also uses an arbitrary default value as a default value without referring to a 790 luminance quantity.

A modulation signal generator 781 is sinusoidal signals with different frequencies (for example, four different types of 100 KHz, 200 KHz, 300 KHz, and 400 KHz), or four orthogonal patterns in a pseudo-random sequence. (For example, it provides a 16-bit sequence obtained from Hadamard matrix as shown in Table 4. Reference literature: "CDMA with MATLAB/Simulink," Author: Yukitoshi Sanada, Tokyo Denki University Press)

TABLE 4

| 1 | 1 | -1 | -1 | -1 | -1 | 1 | 1 | 1 | 1 | -1 | -1 | -1 | -1 | 1 | 1 |
|---|---|----|----|----|----|---|---|---|---|----|----|----|----|---|---|
| 1 | -1 | -1 | 1 | -1 | 1 | 1 | -1 | 1 | -1 | -1 | 1 | -1 | 1 | 1 | -1 |
| 1 | 1 | 1 | 1 | 1 | 1 | 1 | 1 | -1 | -1 | -1 | -1 | -1 | -1 | -1 | -1 |
| 1 | -1 | 1 | -1 | 1 | -1 | 1 | -1 | -1 | 1 | -1 | 1 | -1 | 1 | -1 | 1 |

Upon multiply and accumulation, these sequences are brought to zero between different sequences. It will be obvious that the sinusoidal waves with different frequencies are also brought to zero, when integrated between sections of the order of the least common multiple of a cycle. Namely, all of these sequences have orthogonal properties. Pulse modulated signals such that 1 is set to ON, and -1 is set to OFF are created to allocate to four light emitting diodes. Here, the duration of the minimum pulse was set to 1 microsecond. These modulated signals are supplied to each of the light emitting diodes 73 through a drive circuit 782 to generate a light modulation signal. This light modulation signal from the backside of a liquid crystal panel toward the display side is detected by the photodetector 721. A signal detected from the photodetector is supplied to a correlation detection circuit 783. If a modulating signal is a sinusoidal wave, the correlation detection circuit 783 may exclude ambient noise to detect the amplitude of the light modulation signal by being regarded as a lock-in amp and synchronized with the same frequency. A description will be given of the operation of the correlation detection circuit in a case where a modulating signal is a pseudo random sequence. A correlation between an analog-to-digital conversion value and the pseudo random sequence is obtained with a sampling frequency of 10 MHz. Such a correlation can be obtained, for example, by multiplying 1 of a pseudo random sequence as +1, and 0 as -1 (in the case of the Hadamard matrix, the value may be as described above) by a value sampled by the analog-to-digital conversion to get a product, and finding an accumulation over a time period of integral multiple of the cycle of the pseudo random sequence. The frequencies and the pseudo random sequences allocated to the four colors of RGBW are mutually orthogonal, so that a transmission coefficient may be independently calculated for each of the light emitting diodes even in the case of simultaneous measurement. If this procedure is repeated in a staircase of the next video signal until the stair which is expected to be the last gradation, it is possible to obtain light transmission characteristics of the liquid crystal to the staircase calibration signal as shown in FIG. 8(B) with respect to one color. The deformed transmission curve noted in FIG. 8(B) is attributable to the fact that the liquid crystal has different transmission characteristics depending upon temperature and the degree of deterioration. This signal and ambient illumination on the front surface of the liquid crystal obtained by the 722 photodetector, as well as a backlight luminance signal obtained by the 724 photodetector through a 725 amplifier and AD converter, and a backlight backside luminance signal obtained by the 726 photodetector through the 727 amplifier and AD converter are supplied to a CPU 488, normalized with a predetermined maximum intensity required for the display device, and compared with a staircase video signal for calibration to create its Look Up Table (LUT) and a proper luminance quantity. The resultant Look Up Table is supplied to a video signal converter circuit 785, and the luminance quantity is supplied to a backlight drive circuit 787 to generate a converter circuit based on a primary LUT. After this, the 11-bit staircase signal for calibration is supplied to the video signal input terminal again, in accordance with the flow as shown in FIG. 8(C), and a secondary LUT is created in a similar procedure to generate a secondary converter circuit. This repetition allows for gradual approach to predetermined transmission characteristics. The calibration is completed with the generation of the LUT converter circuit at a point when the error has been minimized, and with the luminance quantity supplied to the backlight drive circuit. In the photodetector 721, the light quantity of backlight is detected together, and detection accuracy may be increased by turning the backlight off as background noise becomes larger. However, this method allows a background element to be removed during correlation detection in demodulating the light modulation signal, and thus the LUT generation is possible even in an on-state of the backlight. The method has been described in a procedure about calibration on each color of color display, but it goes without saying that the calibration may be performed on monochrome display. Note that it makes no difference if the photodetectors 721 and 724 are used as one detector.

The present invention allows for photometry with high precision without manpower, and avoids a display to be shielded when the photometry is not performed. Thus, the present invention has a significantly high industrial value in a liquid crystal display for medical application requiring high gradation property and reproducibility, and in a liquid crystal display with high precision and light gradient for design application.

The invention claimed is:

1. A moving photometric device having a shape which covers a part of a front surface of a liquid crystal display device, and does not cover a front surface of a liquid crystal display screen other than during photometry, comprising:
   a liquid crystal display portion;
   a bezel surrounding all four sides of said liquid crystal display;
   a shaft portion provided at a corner portion of said bezel;
   a moving portion whose end portion is connected to said shaft portion and rotatably attached with a focus on said shaft portion to be placed in said bezel;
   a sensor portion provided in said liquid crystal display portion at the other end portion of the moving portion;
   a CPU to which a detection signal from the sensor portion is supplied;
   a Look Up Table in which the detection signal passing through said liquid crystal display portion and being detected in said sensor portion is normalized with a predetermined maximum intensity required for said liquid crystal display device, compared with a predetermined staircase signal for calibration, and operated for numeric representation, and a proper luminance quantity;
   a liquid crystal drive circuit portion to which said Look Up Table is supplied from said CPU to cause changes in a transmission state of the liquid crystal display device; and
   a backlight drive circuit portion driving backlight of the liquid crystal display device with said proper luminance quantity.

2. The photometric device according to claim 1, characterized in that the moving photometric device having the shape which covers a part of the front surface of the liquid crystal display device, the photometric device having the structure which does not cover the front surface of the liquid crystal display screen other than during the photometry performs photometry by adding reference light of four types of colors of Red, Green, Blue, and White, or one type of color of White facing from a window opened in a part of a reflector plate on the backside of said liquid crystal display device toward the display side during the photometry, and capturing this reference light at the front surface of the liquid crystal display device.

3. The photometric device according to claim 2, characterized in that the moving photometric device having the shape which covers a part of the front surface of the liquid crystal display device, the photometric device having the structure which does not cover the front surface of the liquid crystal display screen other than during the photometry has two sensors; a sensor which adds the reference light from a back surface of the liquid crystal display device during the photometry, and captures this reference light at the front surface of the liquid crystal display device, and a sensor which is implemented in the moving portion or a non-moving portion and performs photometry on the light quantity of outside light, and performs photometry.

4. The photometric device according to claim 1, characterized in that the moving photometric device having the shape which covers a part of the front surface of the liquid crystal display device, the photometric device having the structure which does not cover the front surface of the liquid crystal display screen other than during the photometry performs photometry on a light quantity radiated from the backlight of the liquid crystal display device at the front surface of the liquid crystal display device.

5. The photometric device according to claim 1, characterized in that the moving photometric device having the shape which covers a part of the front surface of the liquid crystal display device, the photometric device having the structure which does not cover the front surface of the liquid crystal display screen other than during the photometry has the two sensors; a sensor which performs photometry on the light quantity radiated from the backlight of the liquid crystal display device at the front surface of the liquid crystal display device, and a sensor which is implemented in the moving portion or the non-moving portion, and performs photometry on the light quantity of the outside light, and performs photometry.

6. The photometric device according to claim 1, characterized in that the moving photometric device having the shape which covers a part of the front surface of the liquid crystal display device, the photometric device having the structure which does not cover the front surface of the liquid crystal display screen other than during the photometry has two sensors; a sensor which adds reference light from a back surface of the liquid crystal display device during the photometry, and captures this reference light at the front surface of the liquid crystal display device, and a sensor which performs photometry on a light quantity radiated from backlight, and performs photometry.

7. The photometric device according to claim 1, characterized in that the moving photometric device having the shape which covers a part of the front surface of the liquid crystal display device, the photometric device having the structure which does not cover the front surface of the liquid crystal display screen other than during the photometry has three sensors; a sensor which adds reference light from a back surface of the liquid crystal display device during the photometry, and captures this reference light at the front surface of the liquid crystal display device, a sensor which performs photometry on a light quantity radiated from backlight, and a sensor which is implemented in the moving portion of a non-moving portion and performs photometry on the light quantity of outside light, and performs photometry.

8. The photometric device according to claim 1, characterized by performing photometry on the light quantity of backlight from the back surface of the liquid crystal device together.

9. The photometric device according to claim 1, characterized by automatically beginning to perform photometry after the moving portion has been manually operated to move to a predetermined position of the photometry.

10. A liquid crystal display device mounting the photometric device according to claim 1.

* * * * *